United States Patent
Zhou et al.

(10) Patent No.: US 7,558,402 B2
(45) Date of Patent: Jul. 7, 2009

(54) SYSTEM AND METHOD FOR TRACKING A GLOBAL SHAPE OF AN OBJECT IN MOTION

(75) Inventors: Xiang Sean Zhou, Plainsboro, NJ (US); Dorin Comaniciu, Princeton Jct., NJ (US); Bogdan Georgescu, Highland Park, NJ (US); Sriram Krishnan, Exton, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 423 days.

(21) Appl. No.: 10/794,476

(22) Filed: Mar. 5, 2004

(65) Prior Publication Data

US 2004/0208341 A1 Oct. 21, 2004

Related U.S. Application Data

(60) Provisional application No. 60/452,669, filed on Mar. 7, 2003, provisional application No. 60/473,425, filed on May 27, 2003, provisional application No. 60/508,367, filed on Oct. 3, 2003.

(51) Int. Cl.
*G06K 9/00* (2006.01)
*A61B 8/00* (2006.01)

(52) U.S. Cl. ........................... 382/103; 600/450
(58) Field of Classification Search ............... 382/103
See application file for complete search history.

(56) References Cited

U.S. PATENT DOCUMENTS

| | | | | |
|---|---|---|---|---|
| 4,101,961 A * | 7/1978 | Fletcher et al. | ............. | 382/132 |
| 4,936,311 A * | 6/1990 | Oe | ............. | 600/508 |
| 5,999,651 A * | 12/1999 | Chang et al. | ............. | 382/215 |
| 6,346,124 B1 * | 2/2002 | Geiser et al. | ............. | 600/450 |
| 6,368,285 B1 * | 4/2002 | Osadchy et al. | ............. | 600/508 |
| 6,385,476 B1 * | 5/2002 | Osadchy et al. | ............. | 600/407 |
| 6,447,453 B1 * | 9/2002 | Roundhill et al. | ............. | 600/443 |
| 6,447,454 B1 * | 9/2002 | Chenal et al. | ............. | 600/449 |
| 6,597,801 B1 * | 7/2003 | Cham et al. | ............. | 382/103 |
| 6,609,093 B1 * | 8/2003 | Gopinath et al. | ............. | 704/236 |
| 2002/0072670 A1 * | 6/2002 | Chenal et al. | ............. | 600/449 |
| 2004/0120550 A1 * | 6/2004 | Comaniciu | ............. | 382/107 |

OTHER PUBLICATIONS

Dorin Comaniciu, Bayesian Kernel Tracking, Springer Berlin / Heidelberg, Sep. 16, 2002, vol. 2449/2002, p. 438-2002.*

Mikic et al., Segmentation and Tracking in Echocardiographic Sequences: Active Contours Guided by Optical Flow Estimates, Apr. 1998, IEEE Transactions on Medical Imaging, vol. 17, No. 2, p. 274-284.*

(Continued)

*Primary Examiner*—Bhavesh M Mehta
*Assistant Examiner*—David P Rashid

(57) ABSTRACT

A system and method for tracking a global shape of an object in motion is disclosed. One or more control points along an initial contour of the global shape are defined. Each of the one or more control points is tracked as the object is in motion. Uncertainty of a location of a control point in motion is represented using a number of techniques. The uncertainty to constrain the global shape is exploited using a prior shape model. In an alternative embodiment, multiple appearance models are built for each control point and the motion vectors produced by each model are combined in order to track the shape of the object. The movement of the shape of the object can be visually tracked using a display and color vectors.

56 Claims, 9 Drawing Sheets

OTHER PUBLICATIONS

Davies et al., A Minimum Description Length Approach to Statistical Shape Modeling, IEEE Transactions on Medical Imaging, vol. 21, Issue 5, p. 525-537.*

Black et al., EigenTracking: Robust Matching and Tracking of Articulated Objects Using a View-Based Representation, Jan. 1998, International Journal of Computer Vision, Springer Netherlands, vol. 26, No. 1, p. 63-84.*

Comaniciu, Density Estimation-based Information Fusion for Multiple Motion Computation, Dec. 6, 2002, Proceedings of the Workshop on Motion and Video Computing, p. 1-6.*

Malassiotis et al., Tracking the Left Ventricle in Echocardiographic Images by Learning Heart Dynamics, Mar. 1999, IEEE Transactions on Medical Imaging, vol. 18, No. 3, p. 282-290.*

Friemelk et al., A Real-Time System for Angle-Independent Velocity Detection, Dec. 11, 1991, IEEE Proceedings of the Ultrasonics Symposium, vol. 2, p. 1265-1268.*

Pennec et al., A Framework for Uncertainty and Validation of 3-D Registration Methods Based on Points and Frames, International Journal of Computer Vision 25(3), Kluwer Academic Publishers, pp. 203-229, 1997.*

Gao et al., Multi-Visit of Kalman Filtering for Semantic Object Tracking, IEEE International Conference of Multimedia and Expo, 2001, pp. 1044-1047.*

Kanazawa Y et al, "Do We Really Have to Consider Covariance Matrices for Image Feature Points?", Electronics & Communications in Japan, Part III—Fundamental Electronic Science, Scripta Technica, New York, US, Translation, vol. 86, No. 1, Part 3, 2003, pp. 1-10.

Malassiotis et al, "Tracking the Left Ventricle in Echocardiographic Images by Learning Heart Dynamics", IEEE Transactions on Medical Imaging, IEEE Inc., New York, US, vol. 18, No. 3, Mar. 1999, pp. 282-290.

Duncan J S et al, "Measurement of Non-Rigid Motion Using Contour Shape Descriptors", Proceedings of the Computer Society Conference on Computer Vision and Pattern Recognition, Lahaina, Maui, Hawaii, Jun. 3-6, 1991, Los Alamitos, IEEE Computer Society Press, US, Jun. 3, 1991, pp. 318-324.

Ramachandran G et al, "Left Ventricle Wall Motion Analysis During Various Phases of Cardiac Cycle From 2D-Echocardiographic Images", Engineering in Medicine and Biology Society. 1991. vol. 13, No. 1, pp. 235-236.

Bohs L N et al, "Real Time Ultrasonic Flow Imaging NSF/ERC Unit 2.1B", Engineering in Medicine and Biology Society, 1990, Proceedings of the Twelfth Annual International Conference of the IEEE Philadelphia, PA, US Nov. 1-4, 1990, New York, NY, US, IEEE, Nov. 1, 1990, p. 670.

Guse R et al, "RGPSview: A Tool for RGPS Data Visualization", Geoscience and Remote Sensing Symposium, 2000, Proceedings, IGARSS 2000, IEEE 2000 International Jul. 24-28, 2000, Piscataway, NJ, US, IEEE vol. 7, Jul. 24, 2000, pp. 3006-3008.

Comaniciu D, "Density Estimation-Based Information Fusion for Multiple Motion Computation", Motion and Video Computing, 2002 Proceedings, Workshop on Dec. 5-6, 2002, Piscataway, NJ, US IEEE, Dec. 5, 2002, pp. 241-246.

International Search Report including Notification of Transmittal of the International Search Report, International Search Report, and Written Opinion of the International Searching Authority.

Baumberg et al., "An efficient method for contour tracking using active shape models", Motion of Non-Rigid and Articulated Objects, 1994, Proceedings of the 1994 IEEE Workshop in Austin, TX, Nov. 11-12, 1994, pp. 194-199.

Jacob et al., "A Shape Space Based Approach to Tracking Myocardial Borders and Quantifying Regional Left-Ventricular Function Applied in Echocardiography", IEEE Transactions on Medical Imaging, vol. 21, No. 3, Mar. 2002, pp. 226-238.

Nascimento et al., "Robust shape tracking in the presence of cluttered background", IEEE Transactions on Multimedia, vol. 3, Sep. 10, 2000, pp. 82-85.

Brand et al., "Flexible flow for 3d nonrigid tracking and shape recovery", Proceedings 2001 IEEE Conf. on Computer Vision and Pattern Recognition, Kauai, Hawaii, Dec. 8-14, 2001, vol. 1 of 2, pp. 315-322.

Comaniciu, "Bayesian Kernel Tracking", Lecture Notes in Computer Science LNCS 2449, Proceedings of $24^{th}$ DAGM Symposium, Zurich, Sep. 16, 2002, pp. 438-445.

Cohen et al., "Tracking Points on Deformable Objects Using Curvature Information", Lecture Notes in Computer Science, Proceedings of ECCV 1992, vol. 588, May 1992, pp. 458-466.

M.J. Ledesma-Carbayo, J. Kybic, M. Sühling, P. Hunziker, M. Desco, A. Santos, M. Unser, "*Cardiac Ultrasound Motion Detection by Elastic Registration Exploiting Temporal Coherence*," in *Proc. IEEE Int'l Symp. on Biomedical Imaging: Macro to Nano(ISBI'02)*, Washington DC, USA, vol. II, pp. 585-588, Jul. 7-10, 2002.

S. L. Schwartz, Q. Cao, M. A. Vahnan, and N.G. Pandian, "Automatic backscatter analysis of regional left ventricular systolic function using color kinesis," *Am. J. Cardiol.*, 77, pp. 1345-1350, 1996.

M. Sühling, M. Arigovindan, P. Hunziker, M. Unser, "*Motion Analysis of Echocardiograms Using a Local-Affine, Spatio-Temporal Model*," in *Proc. IEEE Int'l Symp. on Biomedical Imaging: Macro to Nano(ISBI'02)*, Washington DC, USA, vol. II, pp. 573-576, Jul. 7-10, 2002.

Y. Chunke, K. Terada, and S. Oe, "Motion analysis of echocardiograph using optical flow method," *IEEE Int'l Conf. on Systems, Man and Cyber-netics*, vol. 1, pp. 672677, 1996.

J. B. Dias and J. Leitão, "Wall position and thickness estimation from sequences of echocardiographic images," *IEEE Trans. on Medical Imaging*, vol. 15, pp. 25-38, Feb. 1996.

M. Mignotte, J. Meunier, J.-C. Tardif, "Endocardial boundary estimation and tracking in echocardiographic images using deformable templates and Markov Random Fields," *Pattern Analysis and Applications*, 4(4):256-271, Nov. 2001.

V. Chalana, D. T. Linker, D. R. Haynor, and Y. Kim, "A multiple active contour model for cardiac boundary detection on echocardiographic sequences," *IEEE Trans. On Medical Imaging*, 15(3), pp. 290-298, 1996.

I. Mikic, S. Krucinski and J. D. Thomas, "Segmentation and tracking in echocardiographic sequences: Active contours guided by optical flow estimates," *IEEE Trans. on Medical Imaging*, vol. 17, No. 2, pp. 274-284, Apr. 1998.

G. Jacob, A. Noble, and A. Blake, "Robust contour tracking in echocardiographic sequence," in *Proc.ICCV*, Bombay, India, 1998.

G. Jacob, A. Noble, M. Mulet-Parada, and A. Blake, "Evaluating a robust contour tracker on echocardiographic sequences," *Med. Im. Analysis*, 3(1), pp. 63-75, 1999.

G. Jacob, J.A. Noble, C. Behrenbruch, A.D. Kelion, and A.P. Banning, "A shape-space-based approach to tracking myocardial borders and quantifying regional left-ventricular function applied in echocardiography," *IEEE Trans. Medical Imaging*, 21(3), pp. 226-238, 2001.

J.C. McEachen, and J. Duncan, "Shape-based tracking of left ventricular wall motion," *IEEE Transactions on Medical Imaging*, 16, pp. 270-283, 1997.

D. Comaniciu, "*Bayesian kernal tracking,*" *Annual Conf. of the German Society for Pattern Recognition* (DAGM'02), Zurich, Switzerland, 438-445, 2002.

D. Comaniciu, "*Nonparametric information fusion for motion estimation,*" *IEEE Conf. Computer Vision and Pattern Recognition(CVPR'03)*, Madison, Wisconsin, 2003.

T. Cootes and C. Taylor, "Active shape models—their training and application," *Computer Vision and Image Understanding*, 61(1), pp. 38-59, 1995.

T. Cootes and C. Taylor, "Active shape models—'smart snakes'," in *Proc British Machine Vision Conference*, Springer-Verlag, 1992.

P. Hall, D. Marshall, and R. Martin, "Merging and splitting eigenspace models," *IEEE Trans. On PAMI*, 22(9), pp. 1042-1048, 2000.

Y. Bar-Shalom and L. Campo, "The effect of the common process noise on the two-sensor fused-track covariance," *IEEE Trans. Aerosp. and Electronic Systems*, AES-22:803-805, Nov. 1986.

A. Baumberg and D. Hogg, "An efficient method for contour tracking using active shape models," In *Proc. IEEE Workshop on Motion of Non-Rigid and Articulated Objects*, pp. 194-199, 1994.

Y. Leedan, P. Meer, "Heteroscedastic regression in computer vision: Problems with bilinear constraint," Int'l J. of Computer Vision 37(2), pp. 127-150, 2000.

H. Murase and S. K. Nayar, "Visual learning and recognition of 3-d objects from appearance," *Int'l J. of Computer Vision*, 14(1), pp. 5-24, 1995.

M. A. Turk and A. P. Pentland, "Face recognition using eigen-faces," in *Proc. CVPR*, pp. 586-591, Hawaii, 1991.

Davies et al., "A Minimum Description Length Approach to Statistical Shape Modellng", Medical Imaging, IEEE Transactions, vol. 21, Issue 5, May 31, 2002, pp. 1-14.

* cited by examiner

SYSTEM AND METHOD FOR TRACKING A GLOBAL SHAPE OF AN OBJECT IN MOTION

CROSS REFERENCE TO RELATED APPLICATION

This application claims the benefit of U.S. Provisional Application Ser. No. 60/452,669, filed on Mar. 7, 2003, U.S. Provisional Application Ser. No. 60/473,425, filed on May 27, 2003, and U.S. Provisional Application Ser. No. 60/508,367 filed on Oct. 3, 2003 which are incorporated by reference in their entirety.

FIELD OF THE INVENTION

The present invention is directed to a method for tracking a shape that is in motion, and more particularly, to a method for tracking a shape having linear constraints in the presence of heteroscedastic noise.

BACKGROUND OF THE INVENTION

For most visual tracking applications, measurement data are uncertain and sometimes missing: images are taken with noise and distortion, while occlusions can render part of the object-of-interest unobservable. Uncertainty can be globally uniform; but in most real-world scenarios, it is heteroscedastic in nature, i.e., both anisotropic and inhomogeneous. A good example is the echocardiogram (ultrasound heart data). Ultrasound is prone to reflection artifacts, e.g., specular reflectors, such as those that come from membranes. Because of the single "view direction", the perpendicular surface of a specular structure produces strong echoes, but tilted or "off-axis" surfaces may produce weak echoes, or no echoes at all (acoustic "drop out"). For an echocardiogram, the drop-out can occur at the area of the heart where the tissue surface is parallel to the ultrasound beam.

Due to its availability, relative low cost, and noninvasiveness, cardiac ultrasound images are widely used for assessing cardiac functions. In particular, the analysis of ventricle motion is an efficient way to evaluate the degree of ischemia and infarction. Segmentation or detection of the endocardium wall is the first step towards quantification of elasticity and contractibility of the left ventricle. Examples of some existing methods include pixel-based segmentation/clustering approaches (e.g., Color Kinesis), variants of optical flow, deformable templates and Markov random process/fields, and active contours/snakes. Some methods are employed in 2-Dimensional, 3-Dimensional or 4-Dimensional (3D+time) space.

However, most existing segmentation or detection methods do not attempt to recover accurate regional motions of the endocardial wall, and in most cases, motion components along the wall are ignored. This simplified treatment is also employed by contour trackers that search only along the normals of the current contour. This is not suitable for regional wall abnormality detection, because regional motion of an abnormal left ventricle is likely to be off the normal of the contour, not to mention that global motion, such as translation or rotation (due to the sonographer's hand motion or respiratory motion the patient), causes off-normal local motion on the contour as well. It is desirable to track the global shape of endocardial wall as well as its local motion, for the detection of regional wall motion abnormalities. This information can be used for further diagnosis of ischemia and infarction.

In general, covariances can be assigned to image features or flow estimates that reflect underlying heteroscedastic noise. When the data is clean with a low overall noise level, the heteroscedastic nature may be ignorable, and a global uncertainty can be substituted for the local estimates. However, for very noisy inputs, especially those with spatially varying structural noise, the information encoded in the local covariance matrix becomes critical in ensuring reliable and robust inference of objects or underlying image structures.

It is a common practice to impose model constraints in a tracking framework. Examples include simple models such as blobs or parameterized ellipses, and complex models such as discriminative templates. In most practical cases, a subspace model is suitable for shape tracking, since the number of modes capturing the major shape variations is limited and usually much smaller than the original number of feature components used to describe the shape. Furthermore, a Principal Component Analysis (PCA)-based eigenshape subspace can capture arbitrarily complicated shape variations, which, in the original space, even with a very simple parametric model, are highly nonlinear.

If a measurement vector is affected by heteroscedastic noise, an orthogonal projection into the constraining subspace is not only unjustified, but also very damaging in terms of information loss. It can only be justified for the special case when the noise is both isotropic and homogeneous.

However, most existing work on subspace-constrained tracking does not take into account the heteroscedastic noise in the measurements. In the "Point Distribution Model" or "Active Shape Model", a PCA-based subspace shape model is derived based on training shapes with landmark point correspondence. The resulting subspace of eigenshapes captures the most significant variations in the training data set. At detection time, a model is perturbed to create synthetic images for matching against the testing image at a candidate location. However, the measurement noise was not modeled in this process.

Even when heteroscedastic noise characteristics are available, they were typically disregarded during the subspace model fitting. For example, in one known approach where full covariance matrix was captured in the measurements, a rather ad hoc thresholding is applied so that the measurement mean is confined to a hyper-ellipsoid constraint defined by the model covariance. This operation is independent of the measurement noise.

Another known approach applies a two-step approach to impose a shape space constraint in a Kalman filtering framework. The shape space is a linearly transformed affine subspace or eigen-subspace. However, the projection into the shape space is orthogonal, without taking into account the heteroscedastic noise of the measurement. Therefore, this approach leads to information loss during the projection.

Another known approach uses a Gaussian distribution to adaptively model the appearance of the object of interest (face in their case), which is learned using the EM algorithm. As in the present invention, local uncertainty is captured in the covariance matrix. The difference is that the present invention specifically studies the subspace model constraints and the critical choice of intersection over projection when anisotropic uncertainty is present.

Another known approach uses a subspace constraint implicitly during the optical flow estimation, which also utilizes flow uncertainties. Although in a different framework for a different application, present invention recognizes that "more reliable flow-vectors will have more influence in the subspace projection process."

Another known approach applies heteroscedastic regression for fitting ellipses and fundamental matrices. The fitting is achieved in the original space with parameterized models. In the present invention, parameterization of shape variations is avoided—it can be very complicated and highly nonlinear. Instead, the present invention builds subspace linear probabilistic models through, e.g., PCA, and obtain closed-form solutions on both the mean and covariance of the fitted data.

Robust model matching relying on M-estimators or RANSAC has also been applied to limit or eliminate the influence of data components that are outliers with respect to the model. Again, the locally (in space or time) varying uncertainties are not exploited in these frameworks.

Other related approaches include data imputation, the practice of "filling in" missing data with plausible values. Work in this area is rooted in statistics with broad applications toward speech recognition, medical image analysis, and social science, etc. However, the formulation of data imputation problems typically assumes 0-1 availability, i.e., a data component is either missing or available. There is a need for a unified framework for fusing subspace model constraints with information about the shape dynamic and the heteroscedastic nature of the measurement noise and about the shape dynamics.

SUMMARY OF THE INVENTION

The present invention is directed to a system and method for tracking a global shape of an object in motion. One or more control points along an initial contour of the global shape are defined. Each of the one or more control points is tracked as the object is in motion. Uncertainty of a location of a control point in motion is estimated. One form to represent the uncertainty is a covariance matrix. When employing a subspace shape constraint model, the uncertainty is exploited using a non-orthogonal projection and/or information fusion. Each subsequent contour is displayed.

The present invention is also directed to a system for visually tracking movement of a shape of an object. One or more first color vectors are generated to represent contraction of control points along the contour of the shape. One or more second control vectors are generated to represent dilation of control points along the contour of the shape. The first and second color vectors are periodically displayed thereby displaying movement of the shape.

The present invention is also directed to a method for tracking a global shape of an object in motion. One or more control points are defined along the global shape. Each of the one or more control points are tracked as the object is in motion. Multiple appearance models are built for each control point. Motion vectors produced by each model for tracking the shape are combined.

BRIEF DESCRIPTION OF THE DRAWINGS

Preferred embodiments of the present invention will be described below in more detail, wherein like reference numerals indicate like elements, with reference to the accompanying drawings.

DETAILED DESCRIPTION

The present invention is directed to a method for tracking shapes with linear constraints in the presence of heterodastic noise. An example where such a method would be utilized is for tracking the global shape of a myocardial wall as well as its local motion to detect regional wall motion abnormalities in the heart. The method may also be used to track the endocardial wall or epicardial wall of the heart. It is to be understood by those skilled in the art that the present invention may be used in other applications where shape tracking is useful such as, but not limited to, recognizing movement of human features such as head movements, facial features, hand movements or other body movements. The present invention can also be used in 2 dimensional, 3 dimensional and 4 dimensional (3D+time) medical analyses of anatomical structures such as the heart, lungs or tumors that are evolving over time.

Figure 1:
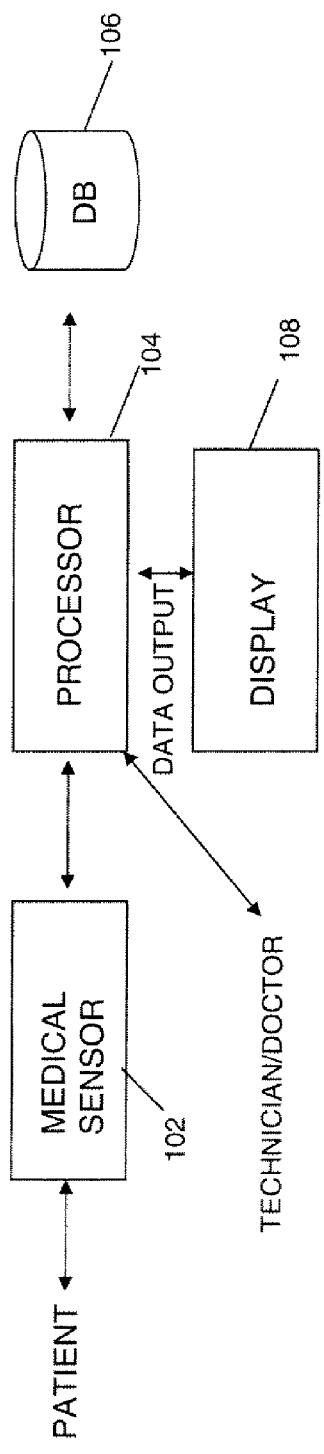
FIG. 1 is a block diagram of an exemplary system for implementing a method for shape tracking in accordance with the present invention.

For purposes of describing the present invention, an example will be described for tracking the endocardial wall of the left ventricle. FIG. 1 illustrates an exemplary architecture of an echocardiograph system that uses a method for tracking the shape of an endocardial wall of a left ventricle in accordance with the present invention. A medical sensor 102, such as an ultrasound transducer is used to perform an examination on a patient. The sensor 102 is used to obtain medical measurements consistent with a particular medical examination. For example, a patient experiencing heart problems may have an echocardiogram performed to help diagnose the particular heart ailment. An ultrasound system provides two-, three-, and four (3D+time)-dimensional images of the heart from various perspectives.

The information obtained by the sensor 102 is communicated to a processor 104 which may be a workstation or personal computer. The processor 104 converts the sensor data into an image that is communicated to display 108. The display 108 may also communicate other graphical information or tables of information relating to the image. In accordance with the present invention, the processor 104 is also provided with data representing an initial contour of the endocardial wall. The data may be provided manually by a user such as a physician or sonographer, or automatically by the processor 104. The contour comprises a series of individual points, the movement of which is tracked by the processor 104 and illustrated on display 108. The specifics regarding how the individual points are tracked will be described in greater detail hereinafter.

In addition to data from the medical sensor 102, the processor 104 may also receive other data inputs. For example, the processor may receive data from a database 106 associated with the processor 104. Such data may include subspace models that represent potential contour shapes for the endocardial wall. These subspace models may be images of left ventricles that are representative of a plurality of patients or may be computer generated models of contour shapes based on statistical information. The processor 104 tracks the individual points of the contour shape using known approaches such as Bayesian kernel matching or optical flow-based methods. Error accumulation during tracking is remedied by using a multi-template adaptive matching framework. Uncertainty of tracking is represented at each point in the form of a covariance matrix, which is subsequently fully exploited by a subspace shape constraint using a non-orthogonal projection.

Figure 2:
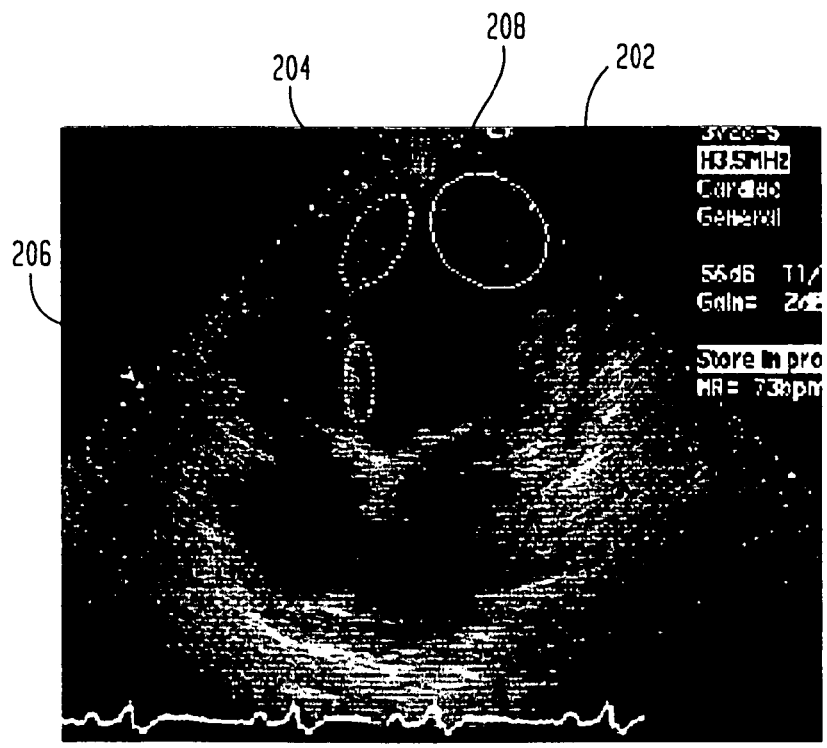
FIG. 2 is an echocardiography image of a heart that illustrates areas of acoustic drop out and estimated local wall motion uncertainties.

FIG. 2 illustrates a typical echocardiograph image of a heart The part of the endocardial wall of the left ventricle that has acoustic drop out is marked by solid ellipse 208. Estimations of local wall motion are depicted by the doffed ellipses 202, 204 and 206. Because of the acoustic drop out, the endocardium wall is not always at the strongest edge in the image. In accordance with the present invention, a unified framework is used for fusing subspace model constraints with information about the shape dynamic and the heteroscedastic nature of the measurement noise and about the shape dynamics. The subspace model can take the form of a specific subspace distribution, e.g., a Gaussian, or a simple subspace constraint, e.g., the eigenspace model.

The present invention tracks individual control points on a contour that represents the endocardium wall. The tracking may be performed using a Bayesian kernel matching approach or a flow-based approach. An example of a Bayesian kernel matching approach is described in the article authored by co-inventor, Dorin Comaniciu and titled: *Bayesian Kernel Tracking*, Annual Conf. of the German Society for Pattern Recognition (DAGM'02), Zurich, Switzerland, 438-445, 2002 which is incorporated by reference in its entirety. An example of an optical flow based method for tracking the individual points is described in co-pending application Ser. No. 10/681,702 entitled "Density Estimation-Based Information Fusion for Multiple Motion Computation" which is incorporated by reference in its entirety. In accordance with the present invention, error accumulation during tracking is remedied using a multi-template adaptive matching framework, taking advantage of the periodic nature of cardiac motion. Uncertainty of tracking is represented at each point in the form of a covariance matrix, which is subsequently fully exploited by a subspace shape constraint using a non-orthogonal projection.

The tracking framework is a two-step, iterative process over the image sequences. An initial contour with control points is drawn on the first image (either automatically or manually); then, for every subsequent image in order, every control point is first tracked independently, with anisotropic uncertainty also recorded. As the second step, the new contour is projected into a feasible subspace using non-orthogonal projection. The feasible subspace is learned based training contours and also adapted to the current case using the initial contour available to the tracker, also taking into account the confidence of initialization (i.e., a manual initialization carries a higher confidence than a fully automatic one).

As indicated above, during the tracking process multiple templates are employed. The use of the multiple templates results in a more accurate representation of the shape statistics for the current case. In the Bayesian kernel matching approach, a first template is taken from the initialized frame. Subsequent templates are added when they are both sufficiently different from the existing templates, and also sufficiently informative for localization purpose, which is measured by kernel matching with itself: a more informative patch is one that has a higher confidence when matched to itself.

The decision to use more than one templates is based on the observation that the heart motion is periodic, therefore, different appearance patterns within one cycle will all reappear in later cycles. To match with multiple templates, match is made to each template and the one with the best match is selected. Or, to save computation, only the neighboring templates of the previous matching template may be matched, exploiting again the periodic motion.

Uncertainty on matching location is calculated in the neighborhood of the optimal location, with the likelihood map calculated in the same way using the kernel matching process. The likelihood surface is then used for estimating a covariance matrix, through, e.g., fitting with a two-dimensional Gaussian distribution or the inversion of a weighted estimation of the Hessian matrix.

In the case of the flow-based approach, a typical optical flow implementation uses only neighboring frames, making the tracking process over long sequences susceptible to error accumulation and drifting. Multiple templates are employed for flow calculation, much the same way as for kernel matching. A new template is added whenever the flow uncertainty is high, while the local gradient is distinctive from existing templates.

After the new locations are obtained for every control point, the next step is to constrain the overall shape by a statistical model that captures the "legitimate" shape variations of a human heart. PCA-based shape models, which are also known as point distribution models, or active shape models are used.

Figure 3:
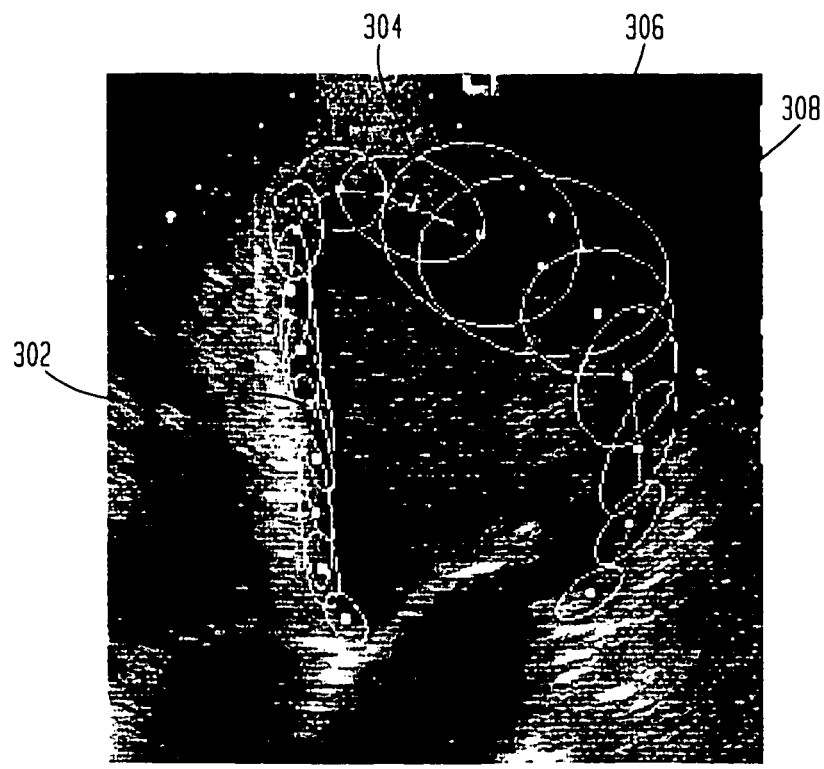
FIG. 3 is an echocardiography image of a left ventricle that illustrates an endocardial contour with localization uncertainties of its control points that are strongly anisotropic and inhomogeneous.

Because the uncertainties over the heart contour are neither homogeneous, some areas are worse than others due to, say, signal dropouts; nor isotropic, for example, there is worse localization along an edge than along the gradient direction. FIG. 3 shows an example of such anisotropic and inhomogeneous noise across a contour. As can be seen, individual points, such as points 302, 304, 306 and 308 have been initially identified along the contour of the endocardial wall. A certainty measurement is taken for each point and an ellipsoid is created around each point which indicates the level of certainty that that particular point is in the correct location; the larger the ellipsoid, the greater the level of uncertainty as to the location of a particular point. As seen in FIG. 3, point 302 has a relatively small ellipsoid surrounding it, thereby indicating that there is a high degree of certainty as to the location of the point on the contour. Points 306 and 308 have relatively large ellipsoids surrounding them, thereby indicating a large degree of uncertainty as to the location of these points.

Taking into account a general uncertainty model over the new contour points, the optimal projection will no longer be orthogonal. The optimal solution in the subspace is in fact the maximal likelihood shape on the intersected distribution in the shape model subspace. Furthermore, if there is a distribution model in the subspace, there is no reason for ignoring such extra information. In the following the detailed analysis is provided as to how to perform non-orthogonal projection; and, if the subspace model distribution is available, how to fuse the information of such a model with the uncertain input.

The present invention uses a subspace model-based fusion approach. Given two noisy measurements of the same n-dimensional variable x, each characterized by a multidimensional Gaussian distribution, $p_1$ and $p_2$, the maximum likelihood estimate of x is the point with the minimal sum of Mahalanobis distances to the two centroids: $x^* = \text{argmin } d_m$ with $$d_m(x-x_1)^T C_1^{-1}(x-x_1) + (x-x_2)^T C_2^{-1}(x-x_2) \quad (1)$$

Taking derivative with respect to x, we get:

$$x^* = C(C_1^{-1}x_1 + C_2^{-1}x_2)$$

$$C = (C_1^{-1} + C_2^{-1})^{-1} \quad (2)$$

This is also known as the best linear unbiased estimate (BLUE) of x.

Assume that one of the Gaussians is in a subspace of dimension p, e.g., $C_2$ is singular. With the singular value decomposition of $C_2 = U\Lambda U^T$, where $U = [u_1, u_2, \ldots, u_n]$, with $u_i$'s orthonormal and $\Lambda = \text{diag}\{\lambda_1, \lambda_2, \ldots, \lambda_p, 0, \ldots, 0\}$, we rewrite Mahalanobis distance to $x_2$ in Eq. (1) in the canonical form:

$$d_{m,2} = (x-x_2)^T C_2^{-1}(x-x_2) = \sum_{i=1}^n \lambda_i^{-1}[U^T(x-x_2)]^2 \quad (3)$$

When $\lambda_i$ tends to 0, $d_{m,2}$ goes to infinity, unless $U_0^T x = 0$, where $U_0 = [u_{p+1}, u_{p+2}, \ldots, u_n]$. (Here we have assumed, without loss of generality, the subspace passes through the origin of the original space. Since $x_2$ resides in the subspace, $U_0^T x_2 = 0$.)

Therefore, we only need to retain in Eq. (3) those terms corresponding to a non-zero $\lambda_i$:

$$d_{m,2} = \sum_{i=1}^p \lambda_i^{-1}[U_p^T(x-x_2)]^2 \equiv (x-x_2)^T C_2^+(x-x_2), \quad (4)$$

where $C^+$ is the pseudoinverse of C, and $U_p = [u_1, u_2, \ldots, u_p]$.

Furthermore, because $U_0^T x = 0$, x can be expressed in another form to reflect this constraint:

$$x = UU^T x = U([U_p|U_0]^T x) = U[y|1] = U_p y, \quad (5)$$

for a 1×p vector y. Eq. (1) now takes the following general form despite singularity:

$$d_m = (U_p y - x_1)^T C_1^{-1}(U_p y - x_1) + (U_p y - x_2)^T C_2^+(U_p y - x_2) \quad (6)$$

Taking derivative with respect to y yields $$y^* = C_{y^*} U_p^T (C_1^{-1} x_1 + C_2^+ x_2) \quad (7)$$

$$C_{y^*} = [U_p^T (C_1^{-1} + C_2^+) U_p]^- \quad (8)$$

$$x^* = U_p y^* = C_{x^*}(C_1^{-1} x_1 + C_2^+ x_2) \quad (9)$$

$$C_{x^*} = U_p C_{y^*} U_p^T \quad (10)$$

Eq. (7) indicates a fusion in the information space, followed by a transformation into the subspace. Eq. (9) is a coordinate transform back into the original space. It can be shown that $C_{x^*}$ and $C_{y^*}$ are the corresponding covariance matrices for $x^*$ and $y^*$.

Notice that this solution is not a simple generalization of Eq. (2) by substituting pseudoinverses for regular inverses, which will not constrain $x^*$ to be in the subspace.

Alternatively, we can write out Eq. (7) and (8) as $$y^*(U_p^T C_1^{-1} U_p + \Lambda_p^{-1})^{-1}(U_p^T C_1^{-1} x_1 + \Lambda_p^{-1} y_2) \quad (11)$$

Here $y_2$ is the transformed coordinates of $x_2$ in the subspace spanned by $U_p$, and $\Lambda_p = \text{diag}\{\lambda_1, \lambda_2, \ldots, \lambda_p\}$.

Eq. (11) can also be shown as a BLUE fusion in the subspace of two distributions, one is $N(y_2, \Lambda_p)$ and the other is the "intersection" (not projection!) of $N(x_1, C_1)$ in the subspace, $N((U_p^T C_1^{-1} U_p)^{-1} U_p^T C_1^{-1} x_1, (U_p^T C_1^{-1} U_p)^{-1})$.

The use of a statistical shape model learned from a large pool of training samples to guide the contours from a specific heart can sometimes be problematic. In accordance with the present invention, the training samples are used to obtain a shape model of the current heart, and not a generic heart. Therefore, there is a strong motivation to adapt the generic model toward what is known for the current case. In accordance with the present invention, the initial contour (manual or through automatic detection) of the endocardial wall of the heart of the patient is examined to adapt the existing PCA model.

In determining the actual contour of the endocardial wall and tracking its movement, two approaches are considered: one with the initial contour being deterministic, and the other with the initial contour being uncertain (this can be the case when the initial contour is from an automatic detection algorithm, which also provides uncertainties).

When the initial contour is assumed to be a point (deterministically certain), a strongly-adapted-PCA (SA-PCA) model is used to track the movement of the point. It is assumed that the old PCA model (excluding the current case) and the initialized contour for the current case jointly represent the variations of the current case, but with relative energy (i.e., representative power) being $\alpha$ and $(1-\alpha)$, respectively, with $0 < \alpha < 1$. In other words, we assume that a portion of shape variations of the current case will be represented in the generic model, while the rest is captured in the direction of the initial contour.

The PCA model is denoted by its mean, eigenvalue matrix, and eigenvector matrix by $x_m$, $\Lambda$, and U, respectively. If the original full covariance matrix C is stored (this would be the case when the original dimensionality is not forbiddingly high), the adapted mean and covariance matrix are simply the weighted sum of the two contributing sources:

$$x_{m,new} = \alpha x_m + (1-\alpha) i_x \quad (12)$$

$$C_{new} = \alpha(C + (x_m - x_{m,new})(x_m - x_{m,new})^T) + \quad (13)$$
$$(1-\alpha)(x - x_{m,new})(x - x_{m,new})^T$$
$$= \alpha C + \alpha(1-\alpha)(x - x_m)(x - x_m)^T$$

Eigenanalysis can be performed on $C_{new}$ to obtain the new subspace model.

In the case that C is not stored but only $\{x_m, \Lambda, U\}$ is available in the subspace, through straight algebraic manipulations we can arrive at the adapted eigenanalysis results $\{x_{m,new}, \Lambda_{new}, U_{new}\}$ as follows:

The initial contour x has a subspace component as $x_s = U^T x_d$, where $x_d = x - x_m$, and a residual vector as $x_r = (x - x_m) - U x_s$. Let $x_{ru}$ be the normalized version of $x_r$ with norm 1 (or zero if $x_r$ is zero norm).

The adapted eigenvector matrix that represents the combined energy will have the following form:

$$U_{new} = [U, x_{ru}] R \tag{14}$$

R and $\Lambda_{new}$ will be the solutions to the following eigenanalysis problem:

$$\left( \alpha \begin{bmatrix} \Lambda & 0 \\ 0^T & 0 \end{bmatrix} + \alpha(1-\alpha) \begin{bmatrix} x_s x_s^T & e_r x_s \\ e_r x_s^T & e_r^2 \end{bmatrix} \right) R = R \Lambda_{new} \tag{15}$$

where $e_r = x_{ru}^T (x - x_m)$ is the residual energy.

Figure 4:
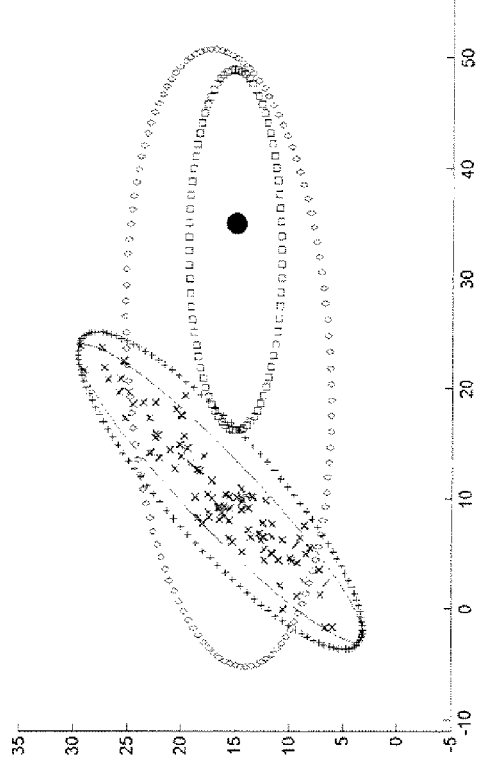
FIG. 4 illustrates examples of an incremental PCA model and a strongly adapted PCA (SA-PCA) model with different $\alpha$ values.

Above formulae are more general than IPCA, with tunable energy ratios between the new data and the old data. These become equivalent to IPCA if we set α to be the fraction of points in the model versus the total number of points. Typically, this will be a number very close to 1 since the number of contours in the training set is usually large. With a set at a smaller value (say, 0.5), the PCA model is strongly adapted toward the current case, hence the name. FIG. 4 shows a simple two-dimensional illustration of IPCA and SA-PCA with different α values.

Point 404 represents the current case. Each x 402 represents a training point corresponding to a particular model. Ellipse 406 shows the original model distribution. Ellipse 408 illustrates an Incremental PCA model which corresponds to a strongly adapted PCA model in which α=0.99. Ellipse 410 illustrates a strongly adapted PCA model in which α=0.5. Ellipse 412 illustrates a strongly adapted PCA model in which α=0.1. Each ellipse depicts a 90% equal-probable contour of the corresponding distribution.

Indeed, the contours from the current heart are much more likely to resemble the initial contour of the same heart than those contours in the generic training set, especially if the current heart has an irregular shape that is not well represented in the training set. In our system, we set α at 0.5. This permits a strong influence from the initial contour: 50% of model energy is from the initial contour (this reduces to only 1% if IPCA is applied with a model trained with 99 examples).

Figure 5A:
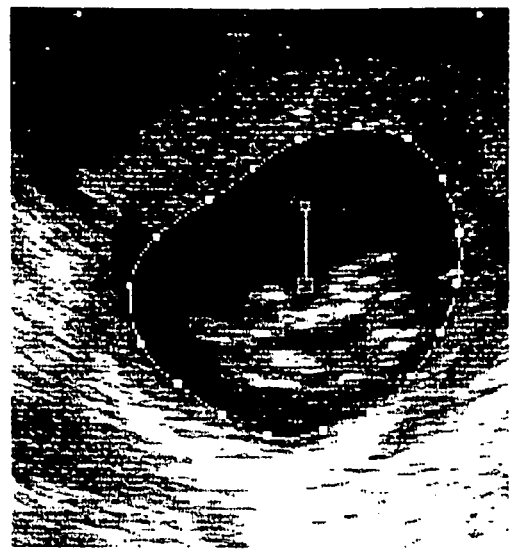
FIGS. 5a-5c illustrate echocardiography images of a left ventricle in which the endocardial wall is initialized (a) and tracked using IPCA (b) and SA-PCA (c)
Figure 5B:
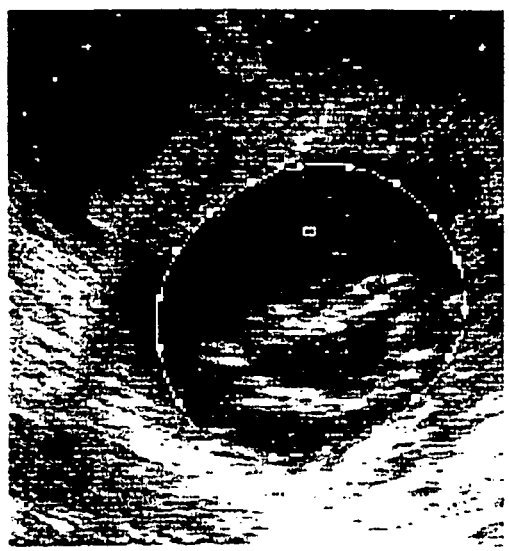
Figure 5C:
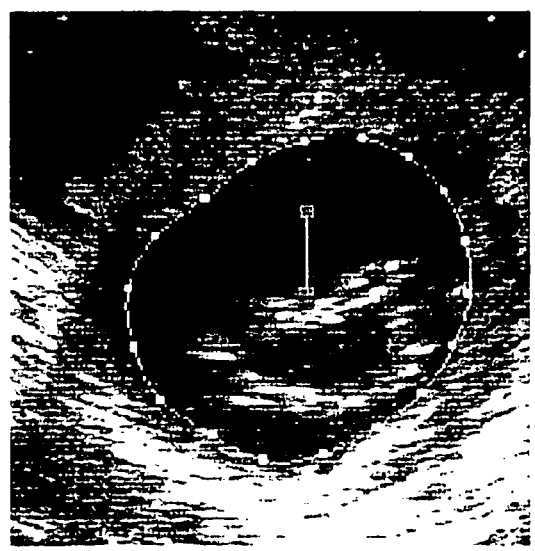

FIGS. 5a-5c show a comparison of IPCA and SA-PCA. This parasternal short axis view has an irregular shape (with a concave part), while the training set is overwhelmingly populated with circular shapes. The incremental PCA model, taking in the initial contour (FIG. 5a) but with a very small weight (<0.01%), fails to capture the concave nature of the current shape; and has constrained the contours to a typical circular shape (FIG. 5b). This result is in fact the same as that obtained using the old PCA model without an incremental step. Our adaptive PCA model with α=0.5, fits much better to the true borders (FIG. 5c).

A subtle while important interaction between the non-orthogonal projection with fusion approach and the SA-PCA model adaptation is as follows: the fusion with the model mean and covariance is necessary to filter out contours that are in the subspace but too far from the model distribution. However, this stronger constraint (than orthogonal projection) will inevitably alter low likelihood, or outlier heart contours. The SA-PCA model mediates this dilemma through a strong model shift toward the direction of the current case using the extra information provided in the initial contour given.

A Kalman filter fuses information from the prediction defined by a dynamic process and from noisy measurements. When applied for shape tracking, additional global constraints are necessary to stabilize the overall shape in a feasible range. The present invention utilizes a unified fusion framework to incorporate subspace model constraints into a Kalman filter.

For a Kalman filter, the measurement update equation has the following form:

$$x_{k+1|k+1} = x_{k+1|k} + K(z_{k+1} - H x_{k+1|k}) \tag{16}$$

where $$K = P_{k+1|k} H^T (H P_{k+1|k} H^T + R)^{-1} \tag{17}$$

$$P_{k+1|k+1} = (I - KH) P_{k+1|k} \tag{18}$$

$$P_{k+1|k} = S P_{k|k} S^T + Q \tag{19}$$

Here P is the estimation error covariance, and $x_{i|j}$ is the state estimate at time i given the state at time j. The measurement model is $z_k = H x_k + r_k$, where $r_k$ represents measurement noise with covariance R. The system/process model is $x_{k+1} = S x_k + q_k$, where $q_k$ represents system noise with covariance Q.

Using the approach above, the update equations of the Kalman filter with subspace constraint and heteroscedastic noise are given by $$x_{k+1|k+1} = P_{k+1|k+1} ((P_{k|k} + Q)^+ x_{k|k} + R^{-1} z + C_2^+ x_2) \tag{20}$$

$$P_{k+1|k+1} = U_p [U_p^T (((P_{k|k} + Q)^+ + R^{-1} + C_2^+) U_p] U_p^T \tag{21}$$

where it is assumed that the system noise covariance Q is contained in the subspace. Observe the symmetry of the solution which combines all the available knowledge in the information space. These equations provide a unified fusion of the system dynamics, subspace constraint, and noise information. They represent the complete representation of various uncertainties that affect the tracking system.

In accordance with an alternative embodiment of the present invention, a tracking technique is used that relies on control point based object representations and on robust fusion to integrate model information across frames. A set of control point based object representations are maintained and acquired at different time instances. The estimated motion suggested by the control points are robustly combined to determine the next position of the object. Visual tracking of the object is achieved by maintaining several models over time. The result is a nonparametric representation of the probability density function that characterizes the object appearance. Tracking is performed by obtaining independently from each model a motion estimate and its uncertainty through optical flow. The final estimate for each control point is computed using a robust fusion technique such as a Variable-Bandwidth Density-based Fusion (VBDF) procedure. VBDF computes the location of the most significant mode of the displacements density function while taking into account their uncertainty. The VBDF procedure manages the multiple data sources and outliers in the displacement estimates. Occlusions are naturally handled through the estimate uncertainty for large residual errors. The model is divided in several regions for which the flow is computed independently. The residual alignment error is used to compute the scale of the covariance matrix of the estimate, therefore reducing the influence of the unreliable displacements.

Object tracking challenges due to occlusions and appearance variations are handled in the present invention through a multi-modal control point based approach. Maintaining several representatives for a 2 dimensional appearance model does not restrict it to a unimodal distribution and the VDBF mechanism robustly integrates multiple estimates to determine the most dominant motion for each control point. To model changes during tracking, several exemplars of the object appearance over time are maintained.

Figure 10:
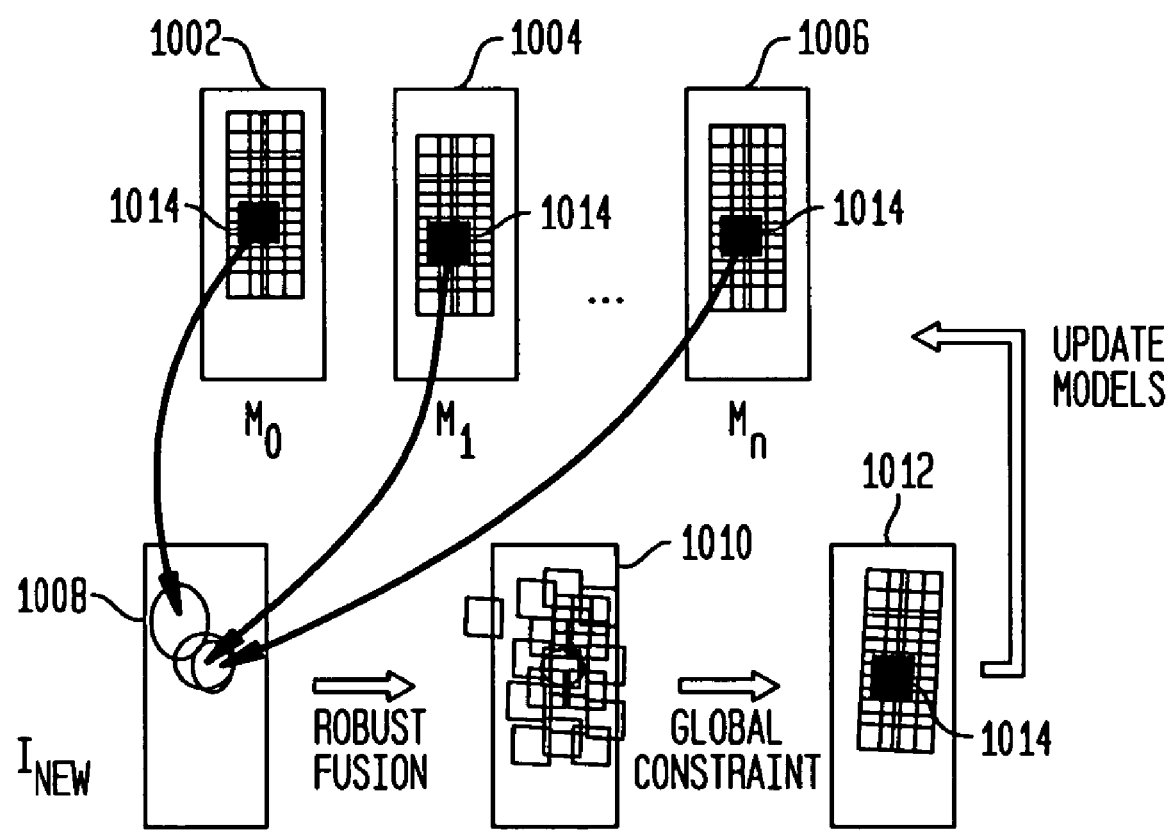
FIG. 10 illustrates a multi-model control point based tracker in accordance with an embodiment of the present invention.

FIG. 10 illustrates an exemplary multi-model control point based tracker in accordance with the present invention. The top three frames 1002, 1004 and 1006 illustrate the current exemplars in the model set, each having associated a set of overlapping control points. A control point based approach is more robust than a global representation and therefore less sensitive to illumination changes and pose. Another advantage of the present invention is that partial occlusion can be handled at the control point level by analyzing the matching likelihood.

Each control point is processed independently; its location and covariance matrix is estimated in the current image with respect to all of the model templates. For example, one of the control points is illustrated by gray rectangle 1014 and its location and uncertainty with respect to each model is shown in $I_{new}$ 1008. The VBDF robust fusion procedure is applied to determine the most dominant motion (mode) with the associated uncertainty as illustrated in frame 1010. Note the variance in the estimated location of each control point due to occlusion or appearance change.

The location of the control points in the current frame is further constrained by a global parametric motion model. A similarity transformation model and its parameters are estimated using the confidence in each control point location. Therefore, the reliable control points contribute more to the global motion estimation. The current frame is added to the model set if the residual error so the reference appearances is relatively low. The threshold is chosen such that the images are not added where the object has significant occlusion. The number of templates in the model can be variable or fixed. If the number of templates are fixed, a scheme can be provided in which to discard certain templates (e.g., discard the oldest template).

A VBDF estimator is based on nonparametric density estimation with adaptive kernel bandwidths. The VBDF estimator is defined as the location of the most significant mode of the density function. The mode computation is based on the variable-bandwidth mean shift technique in a multiscale optimization framework.

Let $x_i \in R^d$, $i=1 \ldots n$ be the available d-dimensional estimates, each having an associated uncertainty given by the covariance matrix $C_i$. The most significant mode of the density function is determined iteratively in a multiscale fashion. A bandwidth matrix $H_i = C_i + \alpha^2 I$ is associated with each point $x_i$, where I is the identity matrix and the parameter a determines the scale of the analysis. The sample point density estimator at location x is defined by $$\hat{f}(x) = \frac{1}{n(2\pi)^{d/2}} \sum_{i=1}^{n} \exp\left(-\frac{1}{2} D^2(x, x_i, H_i)\right) \quad (22)$$

where D represents the Mahalanobis distance between x and $x_i$ $$D^2(x, x_i, H_i) = (x-x_i)^\top H_i^{-1}(x-x_i) \quad (23)$$

The variable bandwidth mean shift vector at location x is given by $$m(x) = H_h(x) \sum_{i=1}^{n} \omega_i(x) H_i^{-1} x_i - x \quad (24)$$

where $H_h$ represents the harmonic mean of the bandwidth matrices weighted by the data-dependent weights $\omega_i(x)$ $$H_h(x) = \left(\sum_{i=1}^{n} \omega_i(x) H_i^{-1}\right)^{-1}. \quad (25)$$

The data dependent weights computed at the current location x have the expression $$\omega_i(x) = \frac{\frac{1}{|H_i|^{1/2}} \exp\left(-\frac{1}{2} D^2(x, x_i, H_i)\right)}{\sum_{i=1}^{n} \frac{1}{|H_i|^{1/2}} \exp\left(-\frac{1}{2} D^2(x, x_i, H_i)\right)} \quad (26)$$

and note that they satisfy $$\sum_{i=1}^{n} \omega_i(x) = 1.$$

It can be shown that the density corresponding to the point x+m(x) is always higher or equal to the one corresponding to x. Therefore iteratively updating the current location using the mean shift vector yields a hill-climbing procedure which converges to a stationary point of the underlying density.

The VBDF estimator finds the most important mode by iteratively applying the adaptive mean shift procedure at several scales. It starts from a large scale by choosing the parameter a large with respect to the spread of the points $x_i$. In this case the density surface is unimodal therefore the determined mode will correspond to the globally densest region. The procedure is repeated while reducing the value of the parameter a and starting the mean shift iterations from the mode determined at the previous scale. For the final step the bandwidth matrix associated to each point is equal to the covariance matrix, i.e. $H_i = C_i$.

The VBDF estimator is a powerful tool for information fusion with the ability to deal with multiple source models. This is important for motion estimation as points in a local neighborhood may exhibit multiple motions. The most significant mode corresponds to the most relevant motion.

Consider that we have n models $M_0, M_1 \ldots M_n$. For each image we maintain c components with their location denoted by $x_{ij}$, $i=1 \ldots n$, $j=1 \ldots c$. When a new image is available, the location and the uncertainty for each component and for each model is estimated. This step can be done using several techniques such as ones based on image correlation, spatial gradient or regularization of spatio-temporal energy. Using the VBDF technique, the result is the motion estimate $x_{ij}$ for each component and its uncertainty $C_{ij}$. Thus $x_{ij}$ represents the location estimate of component j with respect to model i. The scale of the covariance matrix is also estimated from the matching residual errors. This will increase the size of the covariance matrix when the respective control point is occluded therefore occlusions are handled at the control point level.

The VBDF robust fusion technique is applied to determine the most relevant location $x_j$ for component j in the current frame. The mode tracking across scales results in $$\hat{x}_j = C(\hat{x}_j) \sum_{i=1}^{n} \omega_i(\hat{x}_j) \hat{C}_{ij}^{-1} \hat{x}_{ij} \quad (27)$$

$$C(\hat{x}_j) = \left( \sum_{i=1}^{n} \omega_i(\hat{x}_j) \hat{C}_{ij}^{-1} \right)^{-1}.$$

with the weights $\omega_i$ defined as in (26)

$$\omega_i(\hat{x}_j) = \frac{\frac{1}{|C_{ij}|^{1/2}} \exp\left(-\frac{1}{2} D^2(\hat{x}_j, \hat{x}_{ij}, C_{ij})\right)}{\sum_{i=1}^{n} \frac{1}{|C_{ij}|^{1/2}} \exp\left(-\frac{1}{2} D^2(\hat{x}_j, \hat{x}_{ij}, C_{ij})\right)} \quad (28)$$

and note that they satisfy $$\sum_{i=1}^{n} \omega_i(x) = 1.$$

It can be shown that the density corresponding to the point x+m(x) is always higher or equal to the one corresponding to x. Therefore iteratively updating the current location using the mean shift vector yields a hill-climbing procedure which converges to a stationary point of the underlying density.

The VBDF estimator finds the most important mode by iteratively applying the adaptive mean shift procedure at several scales. It starts from a large scale by choosing the parameter a large with respect to the spread of the points $x_i$. In this case the density surface is unimodal therefore the determined mode will correspond to the globally densest region. The procedure is repeated while reducing the value of the parameter a and starting the mean shift iterations from the mode determined at the previous scale. For the final step, the bandwidth matrix associated to each point is equal to the covariance matrix, i.e., $H_i = C_i$.

The VBDF estimator is a powerful tool for information fusion with the ability to deal with multiple source models. This is important for motion estimation as points in a local neighborhood may exhibit multiple motions. The most significant mode corresponds to the most relevant motion.

An example for tracking multiple control point models will now be described in accordance with the present invention. There are n models $M_0, M_1, \ldots, M_n$. For each image c control points with their location denoted by $x_{ij}$, $i=1 \ldots n$, $j=1 \ldots c$ are maintained. When a new image is available, the location and uncertainty for each control point and for each model are estimated. This step can be done using several techniques such as ones based on image correlation, spatial gradient or regularization of spatio-temporal energy. Using the VBDF technique, the result is the motion estimate $x_{ij}$ for each control point and its uncertainty $C_{ij}$. Thus $x_{ij}$ represents the location estimate of component j with respect to model i. The scale of the covariance matrix is also estimated from the matching residual errors. This will increase the size of the covariance matrix when the respective control point is occluded therefore occlusions are handled at the control point level.

The VBDF robust fusion technique is applied to determine the most relevant location $x_j$ for component j in the current frame. The mode tracking across scales results in $$\hat{x}_j = C(\hat{x}_j) \sum_{i=1}^{n} \omega_i(\hat{x}_j) \hat{C}_{ij}^{-1} \hat{x}_{ij} \quad (29)$$

$$C(\hat{x}_j) = \left( \sum_{i=1}^{n} \omega_i(\hat{x}_j) \hat{C}_{ij}^{-1} \right)^{-1}.$$

with the weights $\omega_i$ as defined in (28)

$$\omega_i(\hat{x}_j) = \frac{\frac{1}{|C_{ij}|^{1/2}} \exp\left(-\frac{1}{2} D^2(\hat{x}_j, \hat{x}_{ij}, C_{ij})\right)}{\sum_{i=1}^{n} \frac{1}{|C_{ij}|^{1/2}} \exp\left(-\frac{1}{2} D^2(\hat{x}_j, \hat{x}_{ij}, C_{ij})\right)} \quad (30)$$

Following the computation of each control point, a weighted rectangle fitting is carried out with the weights given by the covariance matrix of the estimates. The image patches are related by a similarity transform T defined by 4 parameters. The similarity transform of the dynamic control point location x is characterized by the following equations.

$$T(x) = \begin{pmatrix} a & -b \\ b & a \end{pmatrix} x + \begin{pmatrix} t_x \\ t_y \end{pmatrix} \quad (31)$$

where $t_x$, $t_y$ are the translational parameters and a, b parameterize the 2D rotation and scaling.

The minimized criterion is the sum of Mahalanobis distances between the reference location $x^0_j$ and the estimated ones $x_j$ ($j^{th}$ control point location in the current frame).

$$(\hat{x}_j - T(x_j^0))^T C(\hat{x}_j)^{-1} (\hat{x}_j - T(x_j^0)). \quad (32)$$

Minimization is done through standard weighted least squares. Note that because the covariance matrix is used for each control point, the influence of points with high uncertainty is reduced.

After the rectangle is fitted to the tracked control points, the dynamic component candidate inside the rectangle is uniformly resampled. It is assumed that the relative position of each control point with respect to the rectangle does not change a lot. If the distance of the resample position and the track position computed by the optical flow of a certain control point is larger than a tolerable threshold, the track position is regarded as an outlier and replaced with a resampled point. The current image is added to the model set if sufficient control points have low residual error. The median residual error between the models and the current frame is compared with a predetermined threshold $T_h$.

Given a set of models $M_0, M_1, \ldots, M_n$ in which the component j has location $x_{ij}$ in frame i, our object tracking algorithm can be summarized by the following steps:

1. Given a new image $I_f$ compute $\hat{x}_{ij}^{(f)}$ through robust optical flow starting from $\hat{x}_j^{(f-1)}$, the location estimated in the previous frame;

2. For j=1 ... c, estimate the location $\hat{x}_j^{(f)}$ of component j using VBDF estimator resulting in Eq. (6);
3. Constrain the component location using the transform computed by minimizing (9);
4. Add the new appearance to the model set if its median residual error is less that $T_h$.

The proposed multi-template framework can be directly applied in the context of shape tracking. If the tracked points represent the control points of a shape modeled by splines, the use of the robust fusion of multiple position estimates increases the reliability of the location estimate of the shape. It also results in smaller corrections when the shape space is limited by learned subspace constraints. If the contour is available, the model templates used for tracking can be selected online from the model set based on the distance between shapes.

Figure 6A:
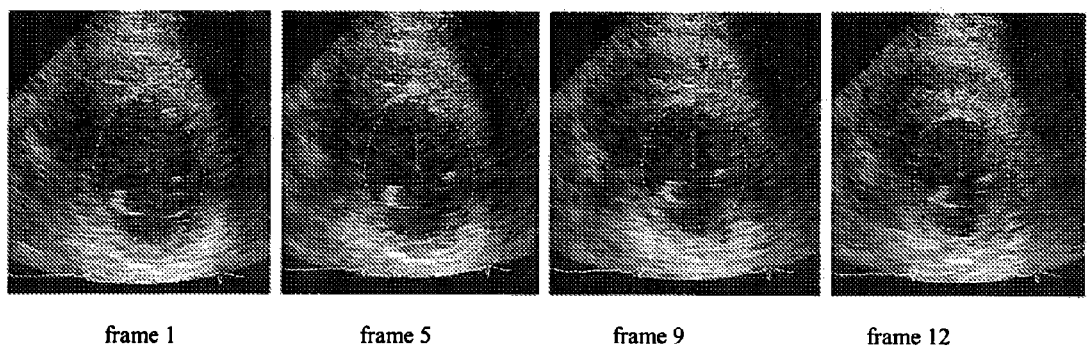
FIGS. 6a and 6b illustrate echocardiography images of a left ventricle wherein the movement of the endocardial wall is tracked in accordance with the present invention.
Figure 6B:
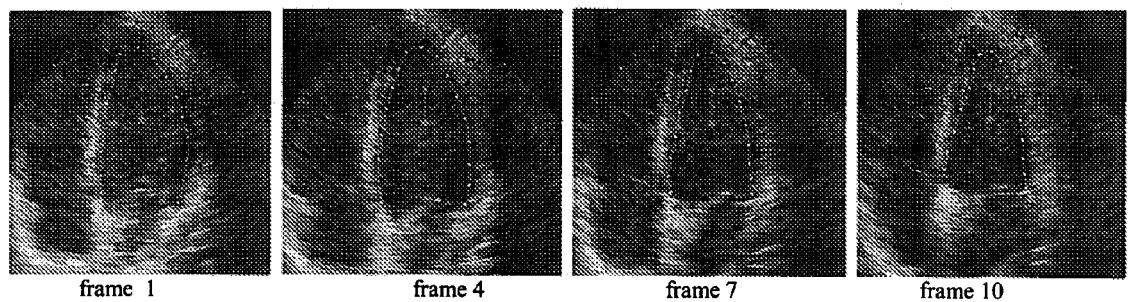

FIGS. 6a and 6b illustrate echocardiography images of a left ventricle in which movement of the endocardial wall is tracked in accordance with the present invention. Frame 1 for each FIG. 602, 610 illustrates the initial contour of the wall as shown by the dots in the image. The subsequent frames 604, 606, 608, 612, 614, 616 illustrate how the movement of the wall is tracked over time. Measurements for each dot are made in accordance with the present invention.

EXAMPLE

Hand traced heart contours in echocardiography images are used as the training set in this example. Both apical four-chamber (open contour) and parasternal short axis (closed contour) views are tested as illustrated in FIGS. 7a-7d and FIGS. 8a-8d. Landmark points are also annotated for each contour. FIG. 7b and FIG. 8b show the set of training contours drawn together. The eigenanalysis approach is applied where every contour is a vector with coordinates of the ordered landmark points as its components (34 components for the open contour and 36 for the closed contour). Then PCA is performed on the matrix whose columns are the training vectors. And the eigenvalues are used to form a diagonal matrix as the model covariance matrix in the subspace. The measurement covariance matrix is adjusted to test different scenarios.

Figure 7A:
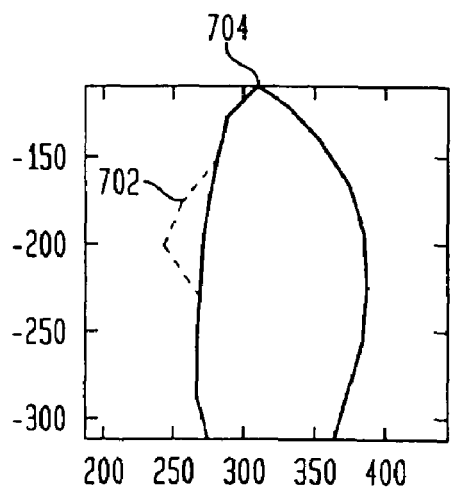
FIGS. 7a-7d illustrate test contours representing echocardiography images of an endocardial wall of a left ventricle from an apical four-chamber view in accordance with the present invention.
Figure 7B:
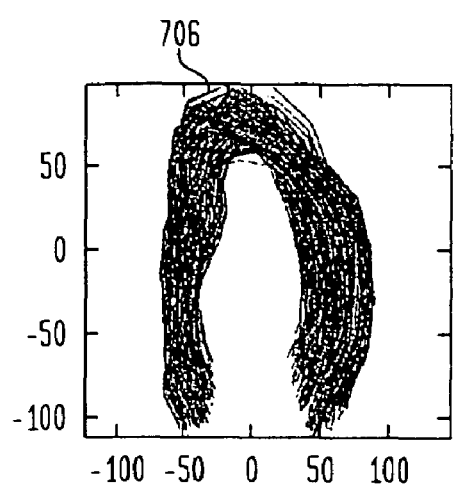
Figure 7C:
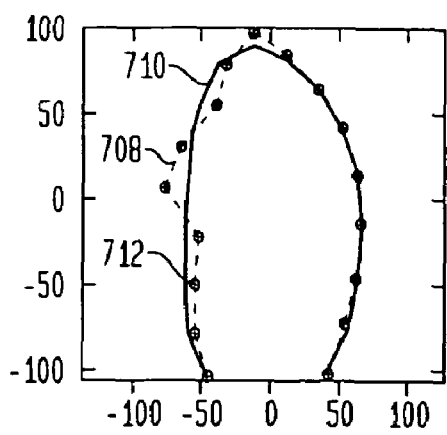
Figure 7D:
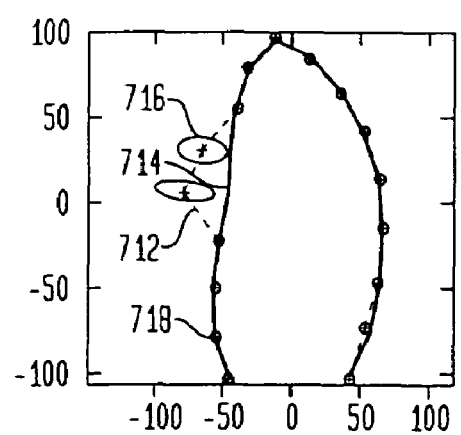
Figure 8A:
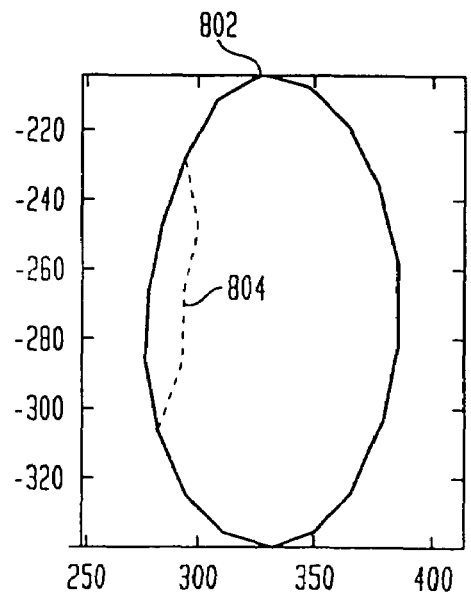
FIGS. 8a-8d illustrate test contours representing echocardiography images of an endocardial wall of a left ventricle from a parasternal short axis view in accordance with the present invention.
Figure 8B:
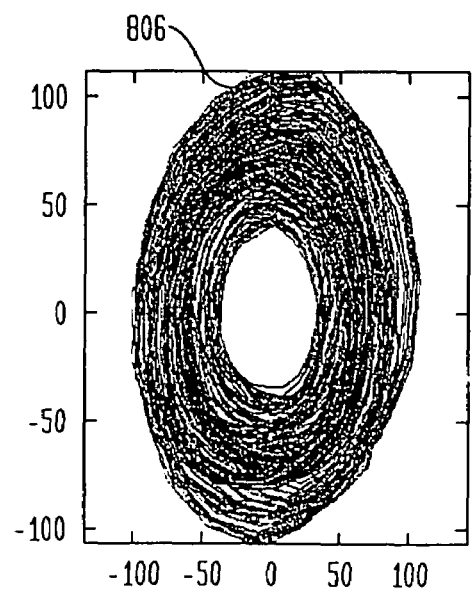
Figure 8C:
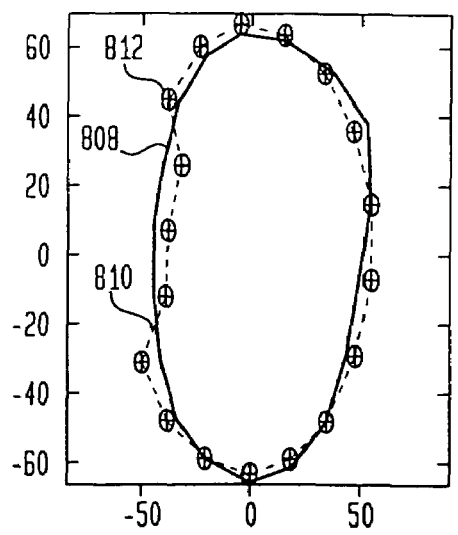
Figure 8D:
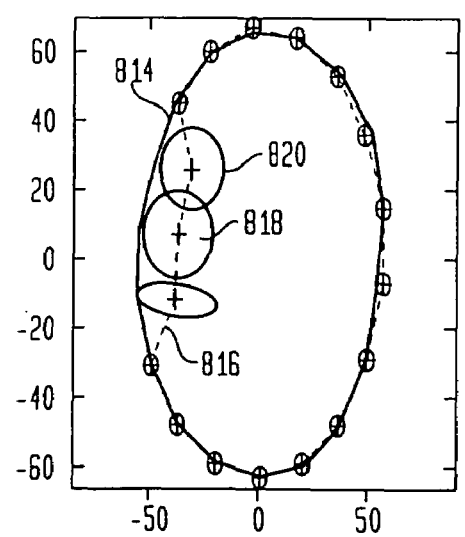
Figure 9A:
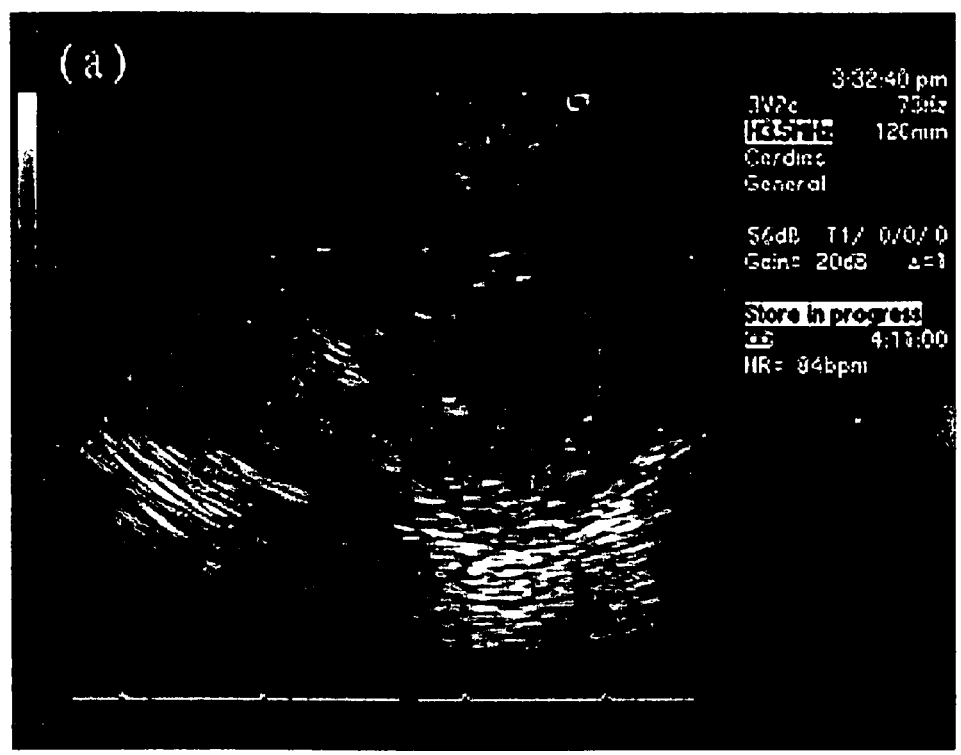
FIG. 9 illustrates echocardiography images which exemplify a method for visualizing the images in accordance with the present invention.
Figure 9B:
Figure 9C:
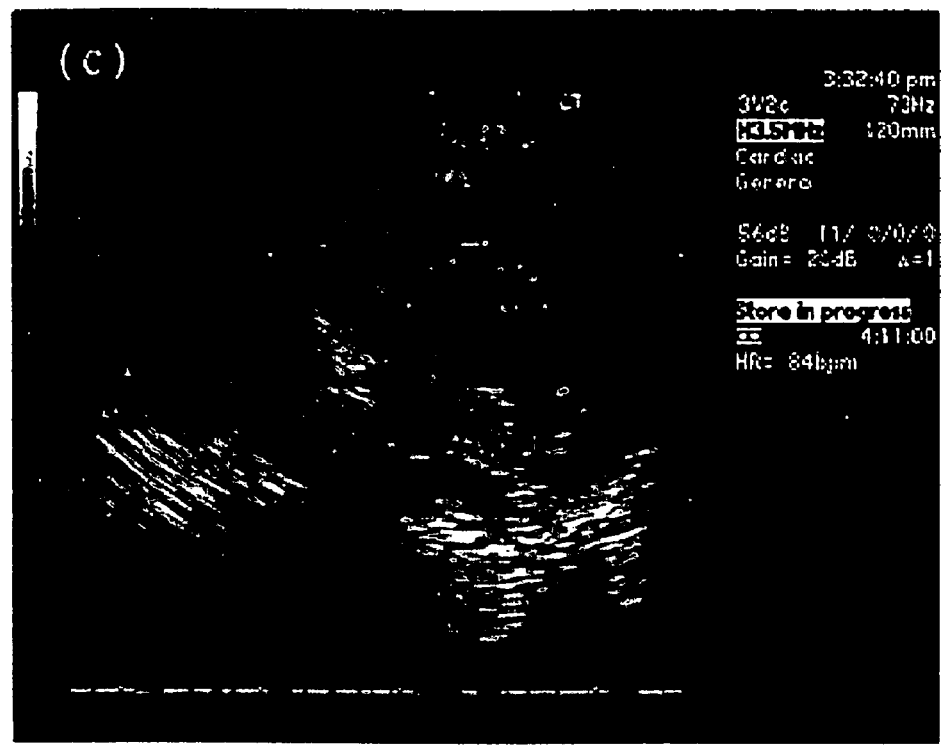
Figure 9D:

FIGS. 7a and 8a illustrate test contours where the solid curves 704, 802 are the ground truth and the dashed curves 702, 804 are the noisy measurements. It is desired to find a contour in the aigen-contour subspace that is the closest to the current noisy contour, with more uncertain point adjusted more. FIGS. 7b and 8b depict the training sets 706 and 806 of contours. FIG. 7c and FIG. 8c show the result when orthogonal projection is applied to the contours of FIG. 7a and FIG. 8a (with isotropic covariance depicted by small circles 712, 812 around the landmark points). Solid curves 710 and 808 are the ground truth and dashed curves 708 and 810 are the noisy measurements. FIG. 7d and FIG. 8d show the results. Solid curves 714 and 814 are the ground truth and dashed curves 718 and 816 are the noisy measurements. Ellipses 716, 818 and 820 are the equal probably contours depicting the covariance at each control point. It is seen that the result is much closer to the ground truth. It is not a perfect fit because the training data is rather different from the test data, therefore, some small shape deformation in the test contour may not be realizable in the subspace.

In accordance with the present invention, the contours can be viewed using a visualization tool to facilitate the diagnosis. To make the doctor diagnose the heart diseases from the echocardiograms more easily, LV contours are displayed by color vectors in real time. The length of the vectors represents the displacement magnitude while the direction of the vectors represents the movement direction of the points on the LV wall contours. For exemplary purposes, the color orange is used to depict when the motion is contraction and the color dark blue is used to depict when the motion is dilation. FIG. 9 shows one of the representing results. The movements of the points on the LV contours are tracked. The movements are smoothed by Gaussian in both temporal and spacious domain. To make it easier seen by the doctors, the length of the vectors is magnified by three times.

By this visualization method, the doctor can easily see the motion of each segment of the endocardium with the magnitude and the directions. Combination of the global motion compensation with this visualization method can make the doctors easily see the contraction direction and magnitude in all the segments of the LV. An ischemic region or other abnormal regions can be identified directly and easily by human eyes.

Having described embodiments for method for determining feature sensitivity during a medical examination, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

We claim:

1. A computer implemented method for tracking a deformable global shape of an object in motion in a sequence of digital medical images, the method performed by the computer comprising the steps of:

providing a probabilistic subspace shape model for the deformable global shape derived from a set of training shapes;

defining one or more control points along the deformable global shape;

tracking each of the one or more control points as the object is in motion;

estimating uncertainty of a location of a control point in motion;

exploiting the uncertainty to constrain the deformable global shape using a point dependent covariance matrix to employ the subspace shape constraint model using a non-orthogonal projection;

fusing the subspace constraint model and the uncertainty to determine a current location of the object by correcting outlier control points according to the probabilistic subspace shape model; and remedying error accumulation during tracking of the one or more control points by using a multi-template adaptive matching framework.

2. The method of claim 1 wherein the step of defining the one or more control points is performed manually.

3. The method of claim 1 wherein the step of defining the one or more control points is performed automatically.

4. The method of claim 1 wherein the step of tracking each of the one or more control points employs a Bayesian kernel matching approach.

5. The method of claim 1 wherein the step of tracking each of the one or more control points employs an optical flow based approach.

6. The method of 1 wherein the subspace shape constraint model is a Gaussian model.

7. The method of claim 1 wherein the subspace shape constraint model is an eigenspace model.

8. The method of claim 1 wherein the object is a myocardial wall of a left ventricle.

9. The method of claim 8 wherein the myocardial wall is imaged via an echocardiogram.

10. The method of claim 8 wherein the shape tracking is used to detect abnormalities in the myocardial wall.

11. The method of claim 8 wherein the myocardial wall is an endocardial wall.

12. The method of claim 8 wherein the myocardial wall is an epicardial wall.

13. The method of claim 1 wherein each control point is tracked independently of the other control points.

14. The method of claim 1 wherein the step of representing uncertainty includes measuring anisotropic uncertainty.

15. The method of claim 1 wherein a strongly adapted Principal Component Analysis (SA-PCA) model is used to constrain the shape.

16. The method of claim 15 wherein the initial shape is used to construct the SA-PCA model.

17. The method of claim 1 wherein the global shape is defined by an ordered set of control points.

18. The method of claim 1 wherein the prior shape model is derived from training data.

19. The method of claim 1 wherein the shape of the object in motion is deformable.

20. The method of claim 19 wherein the motion is non-rigid.

21. The method of claim 1 further comprising the step of:
displaying each subsequent shape.

22. A program storage device readable by a computer, tangibly embodying a program of instructions executable by the computer to perform the method steps for tracking a global shape of an object in motion in a sequence of digital medical images, method comprising:
providing a probabilistic subspace shape model for the deformable global shape derived from a set training shapes;
defining one or more control points along an initial contour of the deformable global shape;
tracking each of the one or more control points as the object is in motion;
estimating uncertainty of a location of a control point in motion;
exploiting the uncertainty to constrain the deformable global shape using a point dependent covariance matrix to employ the subspace shape constraint model using a non-orthogonal projection;
fusing the subspace constraint model and the uncertainty to determine a current location of the object by correcting outlier control points according to the probabilistic subspace shape model; and
remedying error accumulation during tracking of the one or more control points by using a multi-template adaptive matching framework.

23. The computer readable program storage device of claim 22 wherein the control points are defined manually.

24. The computer readable program storage device of claim 22 wherein the control points are defined automatically.

25. The computer readable program storage device of claim 22 wherein tracking each of the one or more control points employs a Bayesian kernel matching approach.

26. The computer readable program storage device of claim 22 wherein tracking each of the one or more control points employs an optical flow based approach.

27. The computer readable program storage device of claim 22 wherein the subspace constraint model is a Gaussian model.

28. The computer readable program storage device of claim 22 wherein the subspace shape constraint model is an eigenspace model.

29. The computer readable program storage device of claim 22 wherein the object is a myocardial wall of a left ventricle.

30. The computer readable program storage device of claim 29 wherein the myocardial wall is imaged via an echocardiogram.

31. The computer readable program storage device of claim 29 wherein the shape tracking is used to detect abnormalities in the myocardial wall.

32. The computer readable program storage device of claim 29 wherein the myocardial wall is an endocardial wall.

33. The computer readable program storage device of claim 29 wherein the myocardial wall is an epicardial wall.

34. The computer readable program storage device of claim 22 wherein each control point is tracked independently of the other control points.

35. The computer readable program storage device of claim 22 wherein the uncertainty representation includes anisotropic uncertainty.

36. The computer readable program storage device of claim 22 wherein a strongly adapted Principal Component Analysis (SA-PCA) model is used to constrain the shape of the contour.

37. The computer readable program storage device of claim 36 wherein the initial shape is used to construct the SA-PCA model.

38. The computer readable program storage device of claim 22 wherein the global shape is defined by an ordered set of control points.

39. The computer readable program storage device of claim 22 wherein the prior shape model is derived from training data.

40. The computer readable program storage device of claim 22 wherein the shape of the object in motion is deformable.

41. The computer readable program storage device of claim 40 wherein the motion is non-rigid.

42. The computer readable program storage device of claim 22, the method further comprising the step of:
displaying each subsequent shape.

43. A computer implemented method for tracking a deformable global shape of an object in motion in a sequence of digital medical images, the method performed by the computer comprising the steps of:
providing a probabilistic subspace shape model for the deformable global shape derived from a set of training shapes;
defining one or more control points along the deformable global shape;
tracking each of the one or more control points as the object is in motion;
estimating uncertainty of a location of a control point in motion, wherein estimating uncertainty includes measuring anisotropic uncertainty;
building multiple appearance models for each control point, the multiple appearance models being based on uncertainty of a location of one or more of the control points;
using robust information fusion to compute an estimate of the location and uncertainty of each control point; and combining the appearance models, the uncertainty, and the probabilistic subspace shape model to determine a current location of the object wherein the tracked deformable global shape resides inside the shape model subspace and is a most plausible shape according to uncertainties in global motion estimation local point measurements, and the deformable shape model.

44. The method of claim 43 wherein the robust information fusion is Variable-Bandwidth Density-based Fusion (VBDF).

45. The method of claim 44 wherein robust information fusion comprises the steps of:
  inputting a number of measurements represented by mean vectors and covariance matrices;
  fusing together the measurements by computing variable bandwidth density estimates; and detecting a most significant mode of the variable bandwidth density estimate.

46. The method of claim 43 wherein the object is a myocardial wall of a left ventricle.

47. The method of claim 46 wherein the myocardial wall is imaged via an echocardiogram.

48. The method of claim 46 wherein the shape tracking is used to detect abnormalities in the myocardial wall.

49. The method of claim 46 wherein the myocardial wall is an endocardial wall.

50. The method of claim 46 wherein the myocardial wall is an epicardial wall.

51. The method of claim 43 wherein each control point is tracked independently of the other control points.

52. The method of claim 43 wherein a strongly adapted Principal Component Analysis (SA-PCA) model is used to constrain the shape.

53. The method of claim 52 wherein the initial shape is used to construct the SA-PCA model.

54. The method of claim 43 wherein the global shape is defined by an ordered set of control points.

55. The method of claim 43 wherein the shape of the object in motion is deformable.

56. The method of claim 55 wherein the motion is non-rigid.

* * * * *